United States Patent

Bousfield, III

(10) Patent No.: US 8,804,381 B2
(45) Date of Patent: Aug. 12, 2014

(54) METHODS OF BALANCING REACTIVE POWER IN MULTI-LEVEL MOTOR DRIVES WITH ACTIVE FRONT ENDS

(75) Inventor: John Channing Bousfield, III, Murrysville, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 192 days.

(21) Appl. No.: 13/596,909

(22) Filed: Aug. 28, 2012

(65) Prior Publication Data

US 2014/0063869 A1  Mar. 6, 2014

(51) Int. Cl.
*H02M 5/42* (2006.01)
*G05F 1/70* (2006.01)

(52) U.S. Cl.
USPC ............. 363/37; 363/39; 363/65; 323/207

(58) Field of Classification Search
USPC .................... 363/35, 37, 39–48, 65–72; 323/205–211
See application file for complete search history.

(56) References Cited

U.S. PATENT DOCUMENTS

| | | | |
|---|---|---|---|
| 5,625,545 A | 4/1997 | Hammond | |
| 6,847,531 B2* | 1/2005 | Bixel | 363/71 |
| 7,170,767 B2* | 1/2007 | Bixel | 363/65 |
| 7,940,537 B2* | 5/2011 | Abolhassani et al. | 363/65 |
| 8,427,846 B2* | 4/2013 | Rexilius | 363/17 |

* cited by examiner

*Primary Examiner* — Jessica Han

(57) ABSTRACT

A method of balancing reactive power at a power delivery system is disclosed. The method may include operating a power delivery system that may have a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings. The method may further include controlling the reactive current flow at each power cell by calculating, at a first controller, a reactive current flow adjustment for at least one power cell so that reactive current flow is balanced among each of the plurality of power cells. Each cell may include a plurality of switching devices.

20 Claims, 5 Drawing Sheets

METHODS OF BALANCING REACTIVE POWER IN MULTI-LEVEL MOTOR DRIVES WITH ACTIVE FRONT ENDS

BACKGROUND

The present disclosure relates to methods of balancing reactive power generation among multiple power cells. More specifically, the present disclosure relates to methods of balancing reactive power generation among multiple power cells when operating a motor drive.

Power supplies configured to control a flow of energy between a first alternating current (AC) system and a second AC system are used in a variety of commercial and industrial applications. For example, a power supply is typically used in AC motor control and operation systems. Various power supplies convert energy from a first frequency and voltage to a second frequency and voltage. One way to implement such a power supply is a drive including one or more power cells, each power cell including multiple solid state converters with an intermediate direct current (DC) link. An exemplary power cell may be an electrical device having a three-phase AC input and a single-phase AC output. One exemplary system incorporating such power cells is discussed in U.S. Pat. No. 5,625,545 to Hammond, the disclosure of which is hereby incorporated by reference in its entirety.

Power cells may be either non-regenerative or regenerative. Non-regenerative power cells can drive a motor but cannot control the flow of current to brake a motor by absorbing regenerative power. Regenerative power cells have the capability of absorbing regenerative power and optionally returning it to the source, thus allowing the cell to participating in braking the motor. Recently, power cells have been developed that use switching devices, such as insulated gate bipolar transistors (IGBTs) to allow the cell to assist in both driving and braking a motor. For example, referring to FIG. 1 herein, a power cell 100 includes an active front end 102 that serves as a three-phase bridge as it receives power from dedicated three-phase secondary windings of the transformer via, an input 130. The cell 100 also includes a plurality of input switches 110-115, which may be bidirectional current-controlling devices such as IGBTs or other transistors, thyristors, or other switching devices. Although six transistors in a bridge format—in this example, three pairs of two transistors each connected in parallel across the DC terminals—are illustrated in FIG. 1, other numbers and types of input switches may be used. The input switches control the DC bus voltage in the cell. A DC filter section 106 includes one or more capacitors 108. The remainder of the cell may include an output section 104 such as an H-bridge inverter made up of four output switches 121-124, each connected across the output or DC terminals of the active front end 102 and the DC filter 106, to deliver AC power to the output 132.

A circuit including power cells such as 100 in FIG. 1, when connected to a load such as a motor, can produce both real power flow as well as reactive power flow. Real power flow is balanced by the bridge inverter of the output section 104 and is inherently balanced between multiple power cells. Reactive power flow is controlled by the active front end 102 and isolated from the bridge inverter by the DC filter 106. The DC filter 106 cannot transfer reactive power. Thus, each power cell can independently produce reactive power flow that is not balanced with reactive power flows produced by other power cells. As a result of being unbalanced, reactive power flow may be exchanged among multiple power cells. Thus, power that could be delivered to the transformer primary is lost due to the reactive power flow exchange among the power cells. Similarly, additional harmonics may be present at the transformer primary caused by the imbalanced reactive power produced from the power cells.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In an embodiment, a method of balancing reactive power at a power delivery system may include operating a power delivery system that may have a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings and controlling the reactive current flow at each power cell by calculating, at a first controller, a reactive current flow adjustment for at least one power cell so that reactive current flow is balanced among each of the plurality of power cells. Each cell may include a plurality of switching devices.

In an embodiment, a method of balancing reactive power at a power delivery system may include operating a power delivery system that may include a plurality of power cells arranged in a plurality of ranks such that each of the plurality of power cells is electrically connected to a first transformer comprising one or more primary windings and a plurality of secondary windings such that each cell is electrically connected to one of the secondary windings and a plurality of the secondary windings are phase-shifted with respect to the primary windings, and controlling the reactive current flow at each rank of power cells by calculating, at a first controller, a reactive current flow adjustment for at least one rank of power cells so that reactive current flow is balanced among each of the plurality of ranks. Each cell may include a plurality of switching devices.

DETAILED DESCRIPTION

Figure 2:
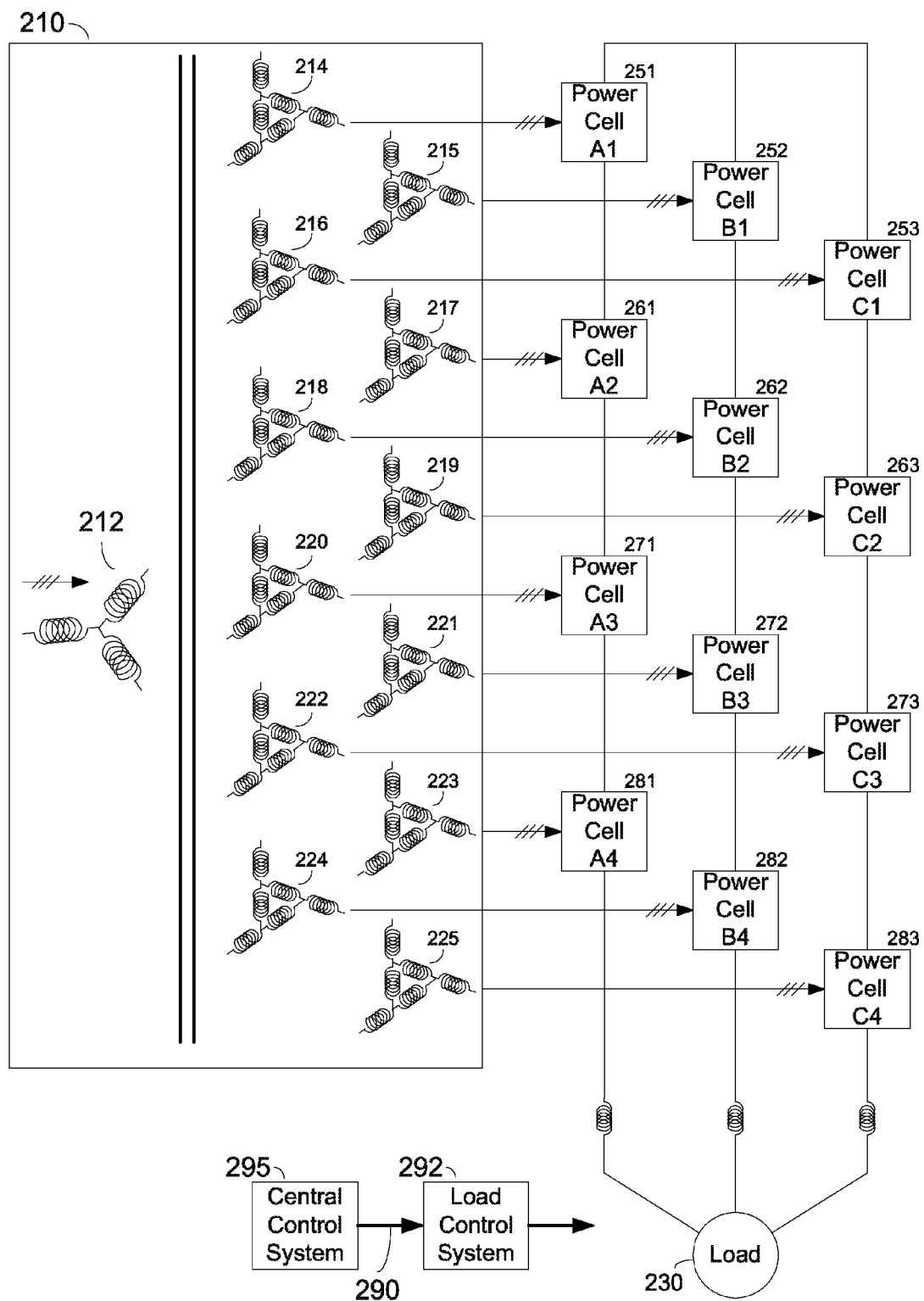
FIG. 2 illustrates a circuit comprising a plurality of power cells connected to a load.

In various embodiments, a multi-level power circuit includes a plurality of power cells to drive a load. FIG. 2 illustrates an exemplary embodiment of a circuit having such power cells. In FIG. 2, a multi-winding machine such as a power source or input transformer 210 delivers three-phase, medium-voltage power to a load 230 such as a three-phase induction motor via an array of single-phase inverters (also referred to herein as power cells). As used herein, the term "transformer" is intended to include any multi-winding machine that is normally on the supply side of the system. The transformer 210 may include primary windings 212 that excite a number of secondary windings 214-225. Although primary winding 212 is illustrated as having a star configuration, a mesh configuration is also possible. Further, although secondary windings 214-225 are illustrated as having a mesh configuration, star-configured secondary windings are possible, or a combination of star and mesh windings may be used. Further, the number of secondary windings illustrated in FIG. 2 is merely exemplary, and other numbers of secondary windings are possible. The circuit as illustrated in FIG. 2 may be used for medium voltage applications or, in some embodiments, other applications. As used herein, medium voltage means a rated voltage greater than 690 volts (V) and less than 69 kilovolts (kV). In some embodiments, medium voltage may include voltages between about 1000 V and about 69 kV. In the embodiments described herein, each secondary winding is phase-shifted from the primary and other secondary windings by a predetermined amount based on the configuration of the windings. Exemplary phase shift angles may be about 0°, +30°, 0°, and −30°. Other phase shift angles are possible depending upon the number and configuration of secondary windings 214-225.

Any number of three-phase sets of power cells may be connected between the transformer 210 and the load 230. The power cells may include cells such as those having a configuration of that shown in FIG. 1, or the power cells may include cells having one or more other configurations. Referring to FIG. 2, the system may include a first set or "rank" of power cells 251-253 across the three phases of the load, a second rank of power cells 261-263, a third rank of power cells 271-273, and a fourth rank of power cells 281-283. Fewer than four sets or ranks, or more than four sets or ranks, are possible. A master or central control system 295 sends command signals to a local controller 292 and/or cell-level controls in each cell over fiber optics or another wired or wireless communications medium 290. Both the local controller 292 and the central control system 295 may include a processing device having an associated memory configured to store instructions, algorithms and equations used to perform various calculations. Similarly, both local controller 292 and the central control system 295 may include input/output devices configured to receive and transmit data between various components.

Figure 1:
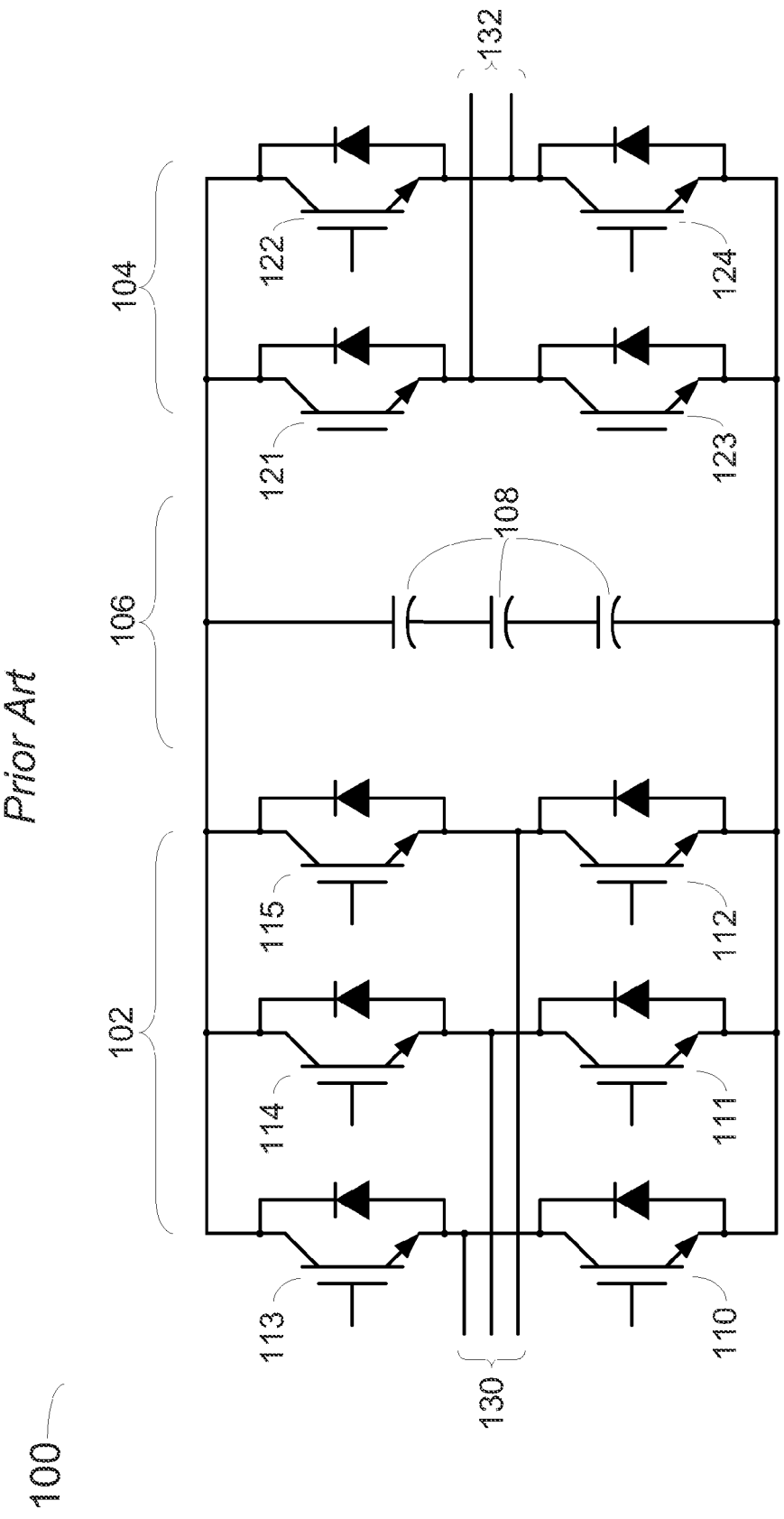
FIG. 1 illustrates a circuit diagram showing exemplary characteristics of a power cell having bidirectional switching devices.

Referring to both FIGS. 1 and 2, direct current may be delivered to the DC filter 106, and alternating current may be delivered to the output 132 of a cell, based on controlling signals that the transistors 121-124 and 110-115 receive from local controller 292. The local controller 292 may select which transistors will be OFF or ON, thus modulating the power that is delivered to the output 132. Optionally, communications circuits such as fiber-optic modulator control links 290 may be used to electrically is late all circuits in any one cell from all circuits in any other cell, and to reduce electromagnetic interference effects which may be imposed between local controller 292 and central control system 295.

The local controller 292 can receive power from a local control power source which may be electrically connected to the secondary winding circuit input.

As discussed above, the motor drive as shown in FIG. 2 may result in non-ideal transformer losses due to non-balanced reactive power flow at each of the power cells. In a typical motor drive, each power cell is sent an identical global reactive current reference value from the central control system during an initialization or start-up routine. Based upon this reactive current reference, each cell may produce reactive current. However, due to a non-ideal construction of the transformer, even though the reactive current is equal between the power cells, each power cell may produce reactive power at a differing rate. This variation is generally caused by the construction of the individual secondary windings in the transformer. To achieve an ideal transformer, the primary winding may be 5 turns and a secondary may be 6.5 turns. However, during construction, the secondary winding is made to be either 6 or 7 turns as 6.5 turns is impossible to construct. Thus, the transformer is non-ideal as that particular secondary winding is constructed to an incorrect number of turns. Thus, during operation, any power cells connected to that secondary winding will receive non-ideal or unequal voltage values. Typical power cells such as the one discussed above will provide balanced real power as a result of the DC link coupling to the inverter when operating in a non-ideal transformer. However, no such coupling exists to force a balance of reactive power, thereby allowing for unequal reactive power among cells when operating in a non-ideal transformer.

For example, in an exemplary ideal transformer, the primary winding has 100 turns and each secondary winding has six turns. Thus, the current ratio is 6:100 (i.e., one secondary amp makes 6/100 or 0.06 primary amps) and the voltage ratio results in 100 volts on the primary making 6 volts on the secondary. Current power cell design utilizes the inductor voltage drop and resistive voltage drop to provide output current. To continue the above example, each power cell's maximum output voltage (or saturation) is seven volts and the reactor's impedance is 0.05 ohms at 50 Hz. When a power cell is outputting seven volts, and the line voltage at the primary is 100 volts, the current produced by the power cell will be (7−6)/(0.05+0.01) or 16.67 amps. A specific system design may requires 10 amps at 6 volts (as reflected to the primary) of reactive current. This would equate to an operating condition of 10*(0.05+0.01)+6 or 6.6 volts. With a 7 volt power cell (such as the one discussed above), there is a 7/6.6 or 6.1% design margin.

With a non-ideal transformer, there may be a +/−7% secondary voltage variance with a distribution of X−7%, 0% and X+7% voltage at no load. Thus, this distribution results in the following current and voltage ratios:

5.61:100 with 100 volts on the primary and 5.61 volts on the secondary

6:100 with 100 volts on the primary and 6 volts on the secondary 6.42:100 with 100 volts on the primary and 6.42 volts on the secondary If all power cells are outputting 10 amps of secondary current the transformer is producing ((10*5.61/100)+(10*6/100)+(10*6.42/100))*sqrt(3)→312.3 VARS. In an ideal transformer, the output reactive power is (3*0.6)*sqrt(3)*100 VARS→311.8 VARS. It should be noted in these calculations the secondary voltage was ignored; rather, the current ratio, secondary current and primary voltage are used.

Using the above calculations in the non-ideal transfer, 10 amps at a 5.61 volt power cell (i.e., a 1−7% power cell) results in a cell voltage of 10*0.06+5.61→6.21V. Similarly, 10 amps at a 6.0 volt power cell results in a cell voltage of 10*0.06+ 6→6.6V. However, 10 amps at a 6.42 volt power cell (i.e., a 1+7% power cell) would result in a cell voltage of 10*0.06+ 6.42→7.02V. As discussed above, each power cell is rated to 7 volts. As such, the third power cell cannot produce 7.02V. Rather, this cell will begin to absorb reactive power produced by the other two power cells. This limits the effective current command to (7.02−6.42)/0.06→9.67 amps, thereby reducing the system VAR output to 301.9 VARS or only 96.7% of design capacity.

The non-ideal transformer as discussed above may be configured such that it produces the required VARS. To achieve the required VARS, one or more current references may be adjusted with a gain value such that each power cells reaches full saturation without absorbing any reactive power produced by other power cells. The current references for each power cell may be adjusted by the error in the transformer. For example, adjusting the current references for the above non-ideal transformer may result in a 10.7 amp current reference for the 5.61 volt power cell, a 10.0 amp current reference for the 6 volt cell, and 9.346 amps for the 6.42 volt cell. Using those current references to generate the reactive power, the 5.61 volt power cell would produce 10.7*0.06+5.61→6.23V, the 6.0 volt power cell would produce 10*0.06+6→6.6V, and the 6.42 power cell would produce 9.346*0.06+6.42→6.98V. Each reactive voltage is within the acceptable rating of 7 volts and, thus, no power cell would begin to absorb reactive power generated by another power cell. If each power cell operates as described in this example, the total reactive power would be ((10.7*5.61/100)+(10*6/100)+(9.346*6.42/100))*sqrt(3) *100 VARS→311.8 VARS, equal to the design specifics of the ideal transformer. Thus, by adjusting the current reference for each power cell based upon the actual operating ratings for each power cell as connected in a non-ideal transformer, reactive power produced may be increased and maximized such that the non-ideal transformer functions at, or near, ideal transformer ratings. This process is discussed in greater detail below with respect to FIGS. 3-5.

Figure 3:
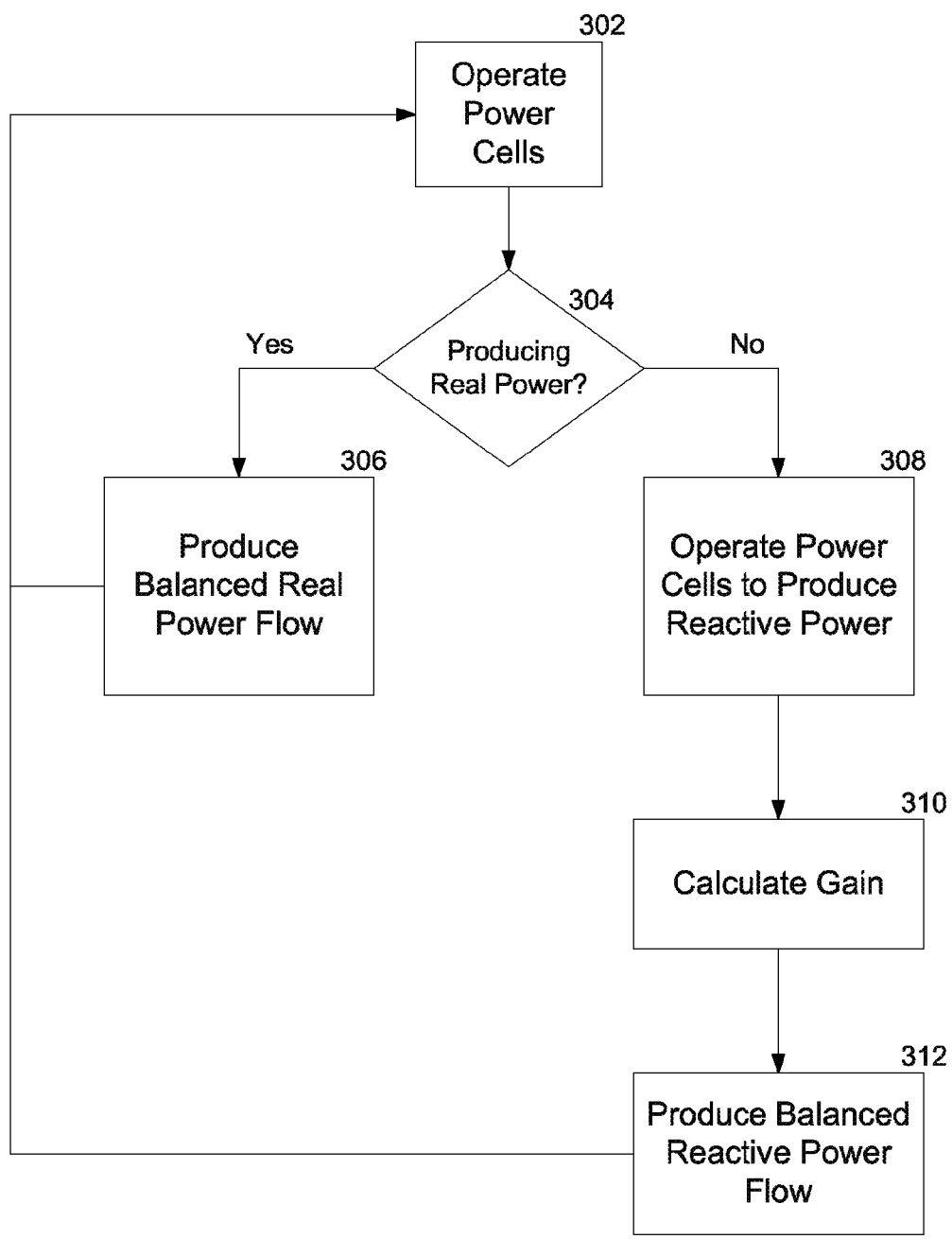
FIG. 3 illustrates a flow diagram describing an exemplary operating procedure for balancing reactive power output according to an embodiment.

FIG. 3 illustrates an exemplary process for operating a plurality of power cells such that the power cells produce balanced reactive power such that a non-ideal transformer will not interfere with the reactive power flow. Initially, the plurality of power cells may operate 302 normally. Normal operation may include operating to produce real power 304 or to produce reactive power. If the power cells are operating to produce real power flow, the real power flow is balanced in each cell by the function of the DC link inverter sections, and thus each power cell produces 306 balanced real power flow.

However, as discussed above, reactive power flow is controlled by the power section of each power cell, which is connected to the transformer secondary windings and is isolated from the inverter section of the power cells by the DC link. Due to the configuration of the components, the DC link cannot transfer the reactive power. This reactive power isolation results in each power cell operating 308 to produce an unbalanced reactive power flow. To contrast this isolation, and thus produce a balanced reactive power flow, a gain value may be calculated 310 for each power cell (or a group of power cells) by a master controller such that each power cell receives an adjusted reactive current reference. Based upon this adjusted current reference, each power cell may produce 312 a balanced reactive power. By producing 312 a balanced reactive power flow, each power cell will not run out of voltage capability and absorb reactive power produced by other power cells, thus maximizing the reactive power returned to the transformer primary.

The process as described in FIG. 3 may be performed upon initialization of the transformer such that each power cell is tested and supplied with an appropriate adjusted current reference. Alternatively, this process may be performed during construction of the transformer and the adjusted current reference may be provided to each cell upon initialization.

Figure 4:
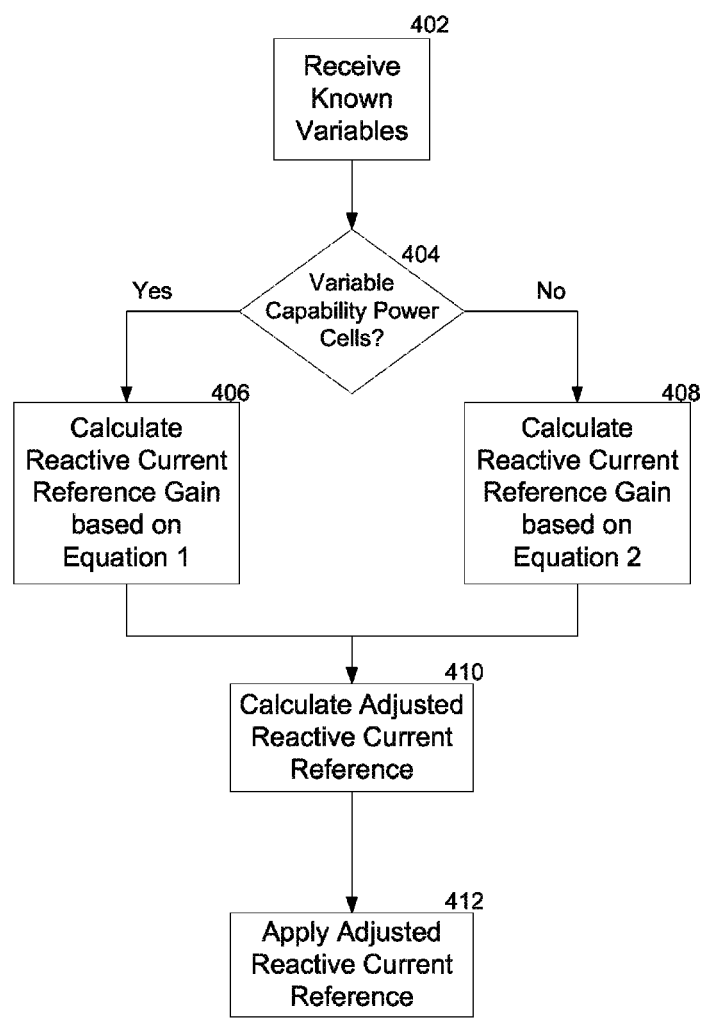
FIG. 4 illustrates a flow diagram describing a first exemplary cell reactive power flow balancing process according to an embodiment.
Figure 5:
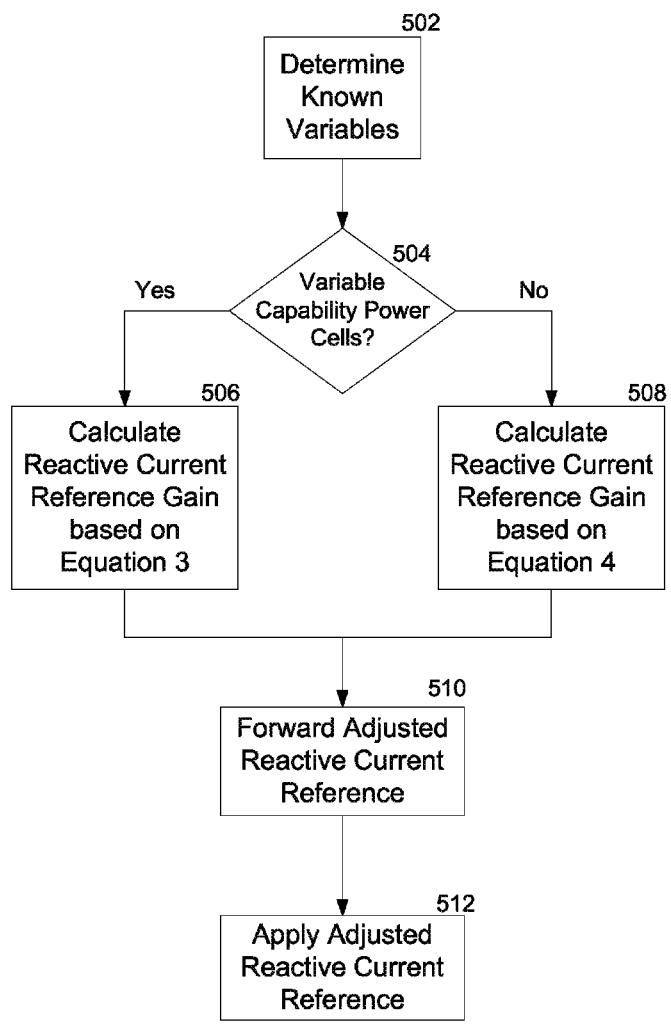
FIG. 5 illustrates a flow diagram describing a second exemplary cell reactive power flow balancing process according to an embodiment.

FIGS. 4 and 5 as discussed below illustrate various exemplary processes for calculating 310 the gain value for each power cell.

FIG. 4 illustrates a first exemplary process for balancing reactive power at each power cell by configuring each power cell to calculate its own reactive current gain based upon system operating parameters when the system is idle. A local controller or input device associated with each power cell may receive 402 a plurality of known variable values. As used herein, the local controller may refer to a controller configured to produce operating signals for one or more power cells as well as a single, integrated controller located within an individual power cell. Additionally, the local control may include a control loop configured to receive a reactive current reference and produce a balanced reactive power flow for one or more power cells. Alternatively, the local controller may be an input device configured to receive a set of control signals produced and transmitted by a master controller or central control system. The power cell may use the received control signals to operate accordingly based upon the central control system's instructions.

The known variable values may be values determined and set by the central control system and transferred globally to each power cell. Example of known variables may include, but are not limited to:

$I_{rated}$: Rated reactive current reference or rated power cell current
$VDC_{rated}$: Controlled DC voltage reference
$V_{mod}$: Converter section voltage lost to modulation
$V_{loss}$: Converter section voltage lost to inherent power device losses
$L_{in}$: Combined leakage and filter losses between primary winding and power cell
$F_{rated}$: Rated system input frequency
$V_{acnom}$: Rated secondary voltage Each of the known variables may be transferred from the central control system to the local controller of each power cell, or, if each power cell includes an integrated control circuit or control loop, to the power cell itself. Based upon these known variable values, the power cell may operate normally producing both balanced real power and unbalanced reactive power.

Based upon the normal operation of the power cell (e.g., during an initialization process), the master control system may determine an equation to calculate a reactive current reference gain based upon the current function of the power cell to adjust the current operation of the power cell to produce balanced reactive power. The calculated reactive current reference gain may then be used to calculate an adjusted reactive current reference. For example, if the master control system determines 404 a power cell is configured to use a variable capability value (i.e., is configured to output a variable real and reactive power flow via the power cell DC voltage output), the master control system may calculate 406 the reactive current reference gain as a value determined based upon the current operating conditions of the power cell divided by the global reactive current reference as expressed in Equation 1 as listed below. Conversely, if the power cell has a fixed capability value based upon a cell rating and overall gain of the power cell (i.e., is configured to output a fixed real and reactive power flow via the power cell DC voltage output), the master control system may calculate 408 the reactive current reference gain as a ratio of the fixed reactive power flow as compared to the expected reactive power flow resulting from current operating conditions as expressed in Equation 2 as listed below.

$$Ir_{gain} = Ir_{cap}/I_{rated} \qquad \text{Equation 1}$$

$$Ir_{ratio} = Ir_{cap}/Ir_{capnom} \qquad \text{Equation 2}$$

Wherein:
$Ir_{cap} = V_{margin}/V_{slope}$
$V_{margin} = V_{cellmax} - Vac$
$V_{ac}$=Transformer secondary voltage as measured at the input terminals of the power cell
$V_{cellmax} = (VDC_{rated} - V_{loss})/(\text{sqrt } 2)$
$V_{slope} = 2*F_{rated}*L_{in}*(\text{sqrt } 3)$
$Ir_{capnom} = V_{marginnom}/V_{slope}$
$V_{marginnom} = V_{cellmax} - Vac_{nom}$ The master control system may then transfer the reactive current gain to the power cell via a set of master control signals during the initialization process. A local controller or internal control loop for the power cell may calculate 410 the adjusted reactive current reference based upon the results of either Equations 1 or 2 as listed above. The power cell control may multiply either $Ir_{gain}$ or $Ir_{ration}$ times the initial global reactive current reference (i.e., $I_{rated}$) to calculate 410 the adjusted reactive current reference or otherwise scale the initial global reactive current reference for that particular power cell. The local control may then apply 412 the adjusted reactive current reference as the control signal for the power cell when producing reactive power. When applied to each power cell in the drive, the process described above results in each power cell having an adjusted reactive current reference determined based upon the current known variables for that power cell, thereby resulting in a balanced reactive power flow among all power cells as each power cell may precisely adjust the reactive current reference being output by that power cell. As opposed to merely using a single, global reactive current reference as is previously done, the method described above provides an adjusted reactive current reference for each power cell to produce balanced reactive power.

FIG. 5 illustrates a second exemplary process for balancing reactive power at each power cell by calculating each power cells reactive current reference gain or gain adjustment at the central control system and passing this information to the power cells. The gains or gain adjustments may be calculated by a central control system for each power cell when the system is idle or during an initialization mode. Once calculated, the gains or gain adjustments may be passed to each power cell [i] within a certain rank [n] such that each power cell in the rank receives the same gains or gain adjustments. The central control system may determine 502 a plurality of known global variable values. Example of known variables may include, but are not limited to:

$I_{rated}$: Rated reactive current reference or rated power cell current
$VDC_{rated}$: Controlled DC voltage reference
$V_{mod}$: Converter section voltage lost to modulation
$V_{loss}$: Converter section voltage lost to inherent power device losses
$L_{in}$: Combined leakage and filter losses between primary winding and power cell
$F_{rated}$: Rated system input frequency
$V_{acnom}$: Rated secondary voltage
$V_{prinom}$: Nominal primary transformer voltage
N: Number of ranks Based upon these known variable global values, the central control system may calculate a reactive current reference gain for the power cells. An adjusted reactive current reference may then be calculated based upon the calculated reactive current reference gain. The central control system may determine 504 an equation to calculate the reactive current reference gain based upon the current function of a specific rank or other grouping of power cells. For example, if the power cells are currently configured to use a variable capability value (i.e., is configured to output a variable real and reactive power flow), the central control system may calculate 506 the reactive current reference gain as a value of the current operating conditions of a rank of power cells divided by the global reactive current reference value as expressed in Equation 3 as listed below. Conversely, if the power cells have a fixed capability value based upon a cell rating and overall gain of the power cells (i.e., is configured to output a fixed real and reactive power flow via the power cell DC voltage output), the central control system may calculate 508 the reactive current reference gain as a ratio of the fixed reactive power flow as compared to expected reactive power flow resulting from current operating conditions for a rank of power cells as expressed in Equation 4 as listed below.

$$Ir_{gainrank[n]} = Ir_{caprank[n]}/I_{rated} \qquad \text{Equation 3}$$

$$Ir_{ratiorank[n]} = Ir_{caprank[n]}/Ir_{capnom} \qquad \text{Equation 4}$$

Wherein:
$Ir_{caprank[n]} = V_{marginrank[n]}/V_{slope}$
$V_{marginrank[n]} = V_{cellmax} - Vac_{rank[n]}$
$Vac_{[n][t]}$=Transformer secondary voltage as measured at the input terminals of the power cell The central control system may calculate $Vac_{rank[n]}$ based upon multiple conditions. For example, if the reactive current reference gains are to be based upon actual conditions, the central control system may determine $Vac_{rank[n]}$ as follows:
Vacrank[n]:

$$1/3 \sum_{i=1}^{3} Vac[i]$$

Otherwise, if the reactive current reference gains are to be based upon nominal operating conditions, the central control system may determine $Vac_{rank[n]}$ as follows:
Vacrank[n]:

$$Vprinom/Vpri * 1/3 \sum_{i=1}^{3} Vac[i]$$

It should be noted that each equation used to determine $Vac_{rank[n]}$ is based upon three cells in each rank. However, each equation may be adjusted accordingly based upon the number of cells in each rank.

The central control system may then forward 510 either $Ir_{gainrank[n]}$ or $Ir_{ratiorank[n]}$ to each local controller or local control loop based upon the location each cell via a series of one or more controller signals. For example, each local controller or local control loop for each power cell in rank 1 will receive either $Ir_{gainrank[1]}$ or $Ir_{ratiorank[1]}$. The local controller may then apply 512 the reactive current reference gain as an adjusted reactive current reference signal for the power cell when producing reactive power. When applied to each power cell in the drive, the process described above results in each rank of power cells having a unique reactive current reference gain determined based upon the current known variables for that rank of power cells, thereby resulting in a balanced reactive power flow among all ranks of power cells as each local controller may precisely adjust the reactive voltage gain at each rank of power cells.

It should be noted that the above processes are shown by way of example only and may be modified accordingly based upon the arrangement and structure of the individual power cells. For example, each power cell may have an integrated control system. In this example, the power cell may be configured to perform the functions of the local controller, communicating directly with the central controller to receive known variable values and to calculate adjusted reactive current reference values. Similarly, a single local controller may be used to control a rank of power cells, or a single local controller may be configured to send control signals to each power cell in a drive circuit.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of balancing reactive power at a power delivery system, comprising:
    operating a power delivery system comprising a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings, wherein each cell includes a plurality of switching devices; and
    controlling the reactive current flow at each power cell by calculating, at a first controller, a reactive current flow adjustment for at least one power cell so that reactive current flow is balanced among each of the plurality of power cells.

2. The method of claim 1, wherein the first controller is at least one local controller, and the calculating a reactive current flow adjustment comprise:
    calculating, by the at least one local controller, the reactive current flow adjustment for each of the plurality of power cells.

3. The method of claim 2, wherein the reactive current flow adjustment is calculated by the at least one local controller based upon one or more variable values received from a central controller.

4. The method of claim 3, wherein the central controller determines the variable values based upon current operating conditions and a fixed output of each power cell.

5. The method of claim 3, wherein the central controller determines the variable values used based upon current operating conditions and a variable output of each power cell.

6. The method of claim 1, wherein the first controller is a central controller, and the calculating a reactive current flow adjustment comprises:
    calculating, by the central controller, the reactive current flow adjustment for each of the plurality of power cells based upon one or more variable values.

7. The method of claim 6, wherein the central controller transfers the reactive current flow adjustment to each of the plurality of power cells.

8. The method of claim 7, wherein the central controller determines the variable values used to calculate the reactive current flow adjustment based upon current operating conditions and a fixed output of each power cell.

9. The method of claim 7, wherein the central controller determines the variable values used to calculate the reactive current flow adjustment based upon current operating conditions and a variable output of each power cell.

10. The method of claim 1, wherein the first controller calculates the reactive current flow adjustment based upon nominal operating conditions for the power delivery system.

11. A method of balancing reactive power at a power delivery system, comprising:
    operating a power delivery system comprising a plurality of power cells arranged in a plurality of ranks such that each of the plurality of power cells is electrically connected to a first transformer comprising one or more primary windings and a plurality of secondary windings such that each cell is electrically connected to one of the secondary windings and a plurality of the secondary windings are phase-shifted with respect to the primary windings, wherein each cell includes a plurality of switching devices; and
    controlling the reactive current flow at each rank of power cells by calculating, at a first controller, a reactive current flow adjustment for at least one rank of power cells so that reactive current flow is balanced among each of the plurality of ranks.

12. The method of claim 11, wherein the first controller is at least one local controller, and the calculating a reactive current flow adjustment comprise:
    calculating, by the at least one local controller, the reactive current flow adjustment for each of the plurality of ranks.

13. The method of claim 12, wherein the reactive current flow adjustment is calculated by the at least one local controller based upon one or more variable values received from a central controller.

14. The method of claim 13, wherein the central controller determines the variable values based upon current operating conditions and a fixed output of each power cell.

15. The method of claim 13, wherein the central controller determines the variable values used based upon current operating conditions and a variable output of each power cell.

16. The method of claim 11, wherein the first controller is a central controller, and the calculating a reactive current flow adjustment comprises:
    calculating, by the central controller, the reactive current flow adjustment for each of the plurality of ranks based upon one or more variable values.

17. The method of claim 16, wherein the central controller transfers the reactive current flow adjustment to each of the plurality of power cells.

18. The method of claim 17, wherein the central controller determines the variable values used to calculate the reactive current flow adjustment based upon current operating conditions and a fixed output of each power cell.

19. The method of claim 17, wherein the central controller determines the variable values used to calculate the reactive current flow adjustment based upon current operating conditions and a variable output of each power cell.

20. The method of claim 11, wherein the first controller calculates the reactive current flow adjustment based upon nominal operating conditions for the power delivery system.

* * * * *